US012722724B1

(12) United States Patent
Langston et al.

(10) Patent No.: US 12,722,724 B1
(45) Date of Patent: Sep. 1, 2026

(54) ARTICULATING-LINK TURNABLE TRACK DRIVE

(71) Applicant: United States of America as represented by the Secretary of the Navy, Arlington, VA (US)

(72) Inventors: Tye A Langston, Panama City, FL (US); Dane P Maglich, Panama City, FL (US)

(73) Assignee: The United States of America as represented by the Secretary of the Navy

( * ) Notice: Subject to any disclaimer, the term of this patent is extended or adjusted under 35 U.S.C. 154(b) by 1065 days.

(21) Appl. No.: 17/587,513

(22) Filed: Jan. 28, 2022

(51) Int. Cl.

| | |
|---|---|
| ***B62D 55/20*** | (2006.01) |
| ***B62D 55/125*** | (2006.01) |
| ***B62D 55/21*** | (2006.01) |
| *B62D 55/30* | (2006.01) |

(52) U.S. Cl.
CPC ......... *B62D 55/202* (2013.01); *B62D 55/125* (2013.01); *B62D 55/21* (2013.01); *B62D 55/30* (2013.01)

(58) Field of Classification Search
CPC ..... B62D 55/202; B62D 55/125; B62D 55/21
USPC .......................................................... 180/9.5
See application file for complete search history.

(56) References Cited

U.S. PATENT DOCUMENTS 4,828,059 A * 5/1989 Naito .................. B62D 55/265 180/119
4,828,339 A * 5/1989 Thomas ............... B62D 55/202 198/300
8,567,536 B1 * 10/2013 Canfield ................ B62D 55/20 180/9.3
2010/0219003 A1 * 9/2010 Rooney, III ............ B63B 59/10 180/9.1
2014/0027191 A1 * 1/2014 Saylor, Jr. ............ B62D 55/265 180/164
2020/0062059 A1 * 2/2020 Watling ................... B63H 1/34
2021/0221483 A1 * 7/2021 Jørgensen .............. B62D 55/21
2022/0033017 A1 * 2/2022 Dockerty ............. B62D 55/084

FOREIGN PATENT DOCUMENTS

WO WO-9721584 A1 * 6/1997 ........... B62D 55/265

OTHER PUBLICATIONS

Translation of WO 9721584 A1. Published on Jun. 19, 1997; Authored by Awamura N. Relevant pp. 5, 10-13, and 19 (Year: 2024).*

* cited by examiner

*Primary Examiner* — Valentin Neacsu
*Assistant Examiner* — Nathaniel William Watkins
(74) *Attorney, Agent, or Firm* — James M. Kasischke; Jeffry C. Severson

(57) ABSTRACT

A track drive for turning on a surface includes a drive wheel and a free wheel. An endless belt engages a portion of the drive wheel and a portion of the free wheel. The endless belt is placed in motion along a direction of travel dictated by the rotation of the drive wheel. The free wheel rotates in correspondence with the motion of the endless belt. The endless belt has a plurality of links coupled to one another for yawing motion between adjacent ones of the links and relative to the direction of travel. A steering device is coupled to the drive wheel for turning the drive wheel to alter the direction of travel. A tensioning device is coupled to the free wheel for moving the free wheel relative to the drive wheel when the drive wheel is turned by the steering device.

14 Claims, 5 Drawing Sheets

ARTICULATING-LINK TURNABLE TRACK DRIVE

ORIGIN OF THE INVENTION

The invention described herein may be manufactured and used by or for the Government of the United States of America for Governmental purposes without payment of any royalties.

FIELD OF THE INVENTION

The invention relates generally to endless track drives, and more particularly to an endless track drive having a turnable drive wheel and articulating links to support a no-skid turning operation of a track drive vehicle equipped with two of the track drives.

BACKGROUND OF THE INVENTION

Vehicles that operate on two track drives (e.g., construction equipment, crawlers, etc.) typically turn by driving one track drive faster than the other to achieve what is known as differential steering or "skid-steer" turning. As the name suggests, this type of turning results in the track drives sliding (or skidding) across the surface they are on, which is usually not desired. Skid-steer turning damages the surface the track drives are operating on and/or the track drives themselves as the fixed orientation track drives drag on the surface. For example, a skid-steer loader will significantly tear up a lawn or dirt surface during a turning operation. When a track drive vehicle operates on a hard surface like pavement or concrete, the sliding action quickly wears away the track material. In cases where there is high friction between the track drives and the operating surface, skid-steer turning requires significant energy and puts additional stress on a track drive's surface-contacting feet, endless belt, axles, sprockets and motor.

In addition to the above-described drawbacks associated with skid-steer turning, using a track drive vehicle on a vertical surface presents traction problems. For example, developers of track drive-based magnetic crawlers that are to operate on vertical metal surfaces know that friction is critical to preventing the crawler from sliding down the vertical surface. However, allowing a track drive to slip or skid during turning is contrary to the need to maximize frictional holding force on a vertical surface. At the same time, the friction holding force presents problems for a vertical-surface crawler when a turn maneuver must be executed.

SUMMARY OF THE INVENTION

Accordingly, an object of the present invention is to provide a track drive that avoids the problems associated with track drive systems and vehicles that rely on skid steering.

Another object of the present invention is to provide a track drive that will reduce damage to surfaces on which the track drive must traverse and maneuver.

Still another object of the present invention is to provide a track drive that can be steered on vertical surfaces such as magnetically-attractive surfaces.

Other objects and advantages of the present invention will become more obvious hereinafter in the specification and drawings.

In accordance with the present invention, a track drive for turning on a surface includes a drive wheel and a free wheel. The drive wheel is adapted to be coupled to a drive motor for rotation thereof. An endless belt engages a portion of the drive wheel and a portion of the free wheel wherein the endless belt is placed in motion along a direction of travel dictated by the rotation of the drive wheel. The free wheel rotates in correspondence with the motion of the endless belt. The endless belt has a plurality of links coupled to one another for yawing motion between adjacent ones of the links and relative to the direction of travel. A steering device is coupled to the drive wheel for turning the drive wheel to alter the direction of travel. A tensioning device is coupled to the free wheel for moving the free wheel relative to the drive wheel when the drive wheel is turned by the steering device.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
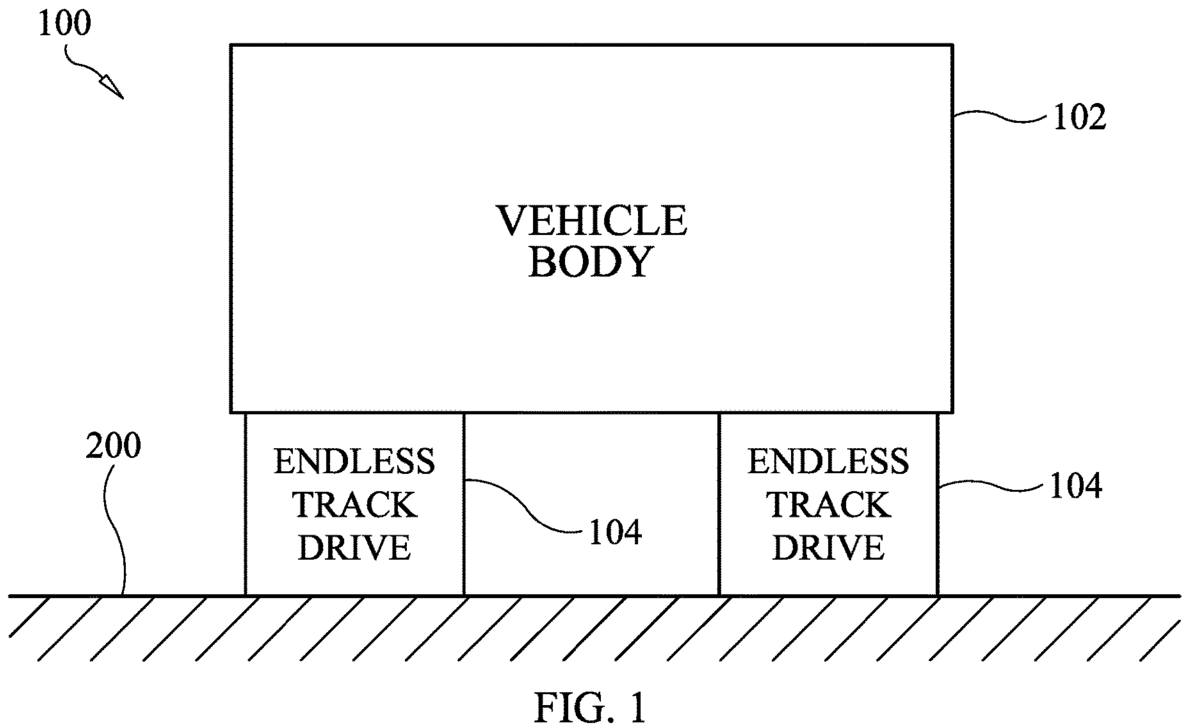
FIG. 1 is a schematic view of a conventional track drive vehicle having two endless track drives coupled to a vehicle body.

Referring now to the drawings, a conventional track drive vehicle is illustrated schematically in FIG. 1 and is referenced generally by numeral 100. As is well-understood in the art, track drive vehicle 100 includes a vehicle body 102 and two spaced-apart endless track drives 104 coupled to vehicle body 102. Typically, track drives 104 are parallel to one another. As used herein, the term "vehicle" includes manned and unmanned vehicles, robots, surface-traversing equipment, etc.

Figure 2:
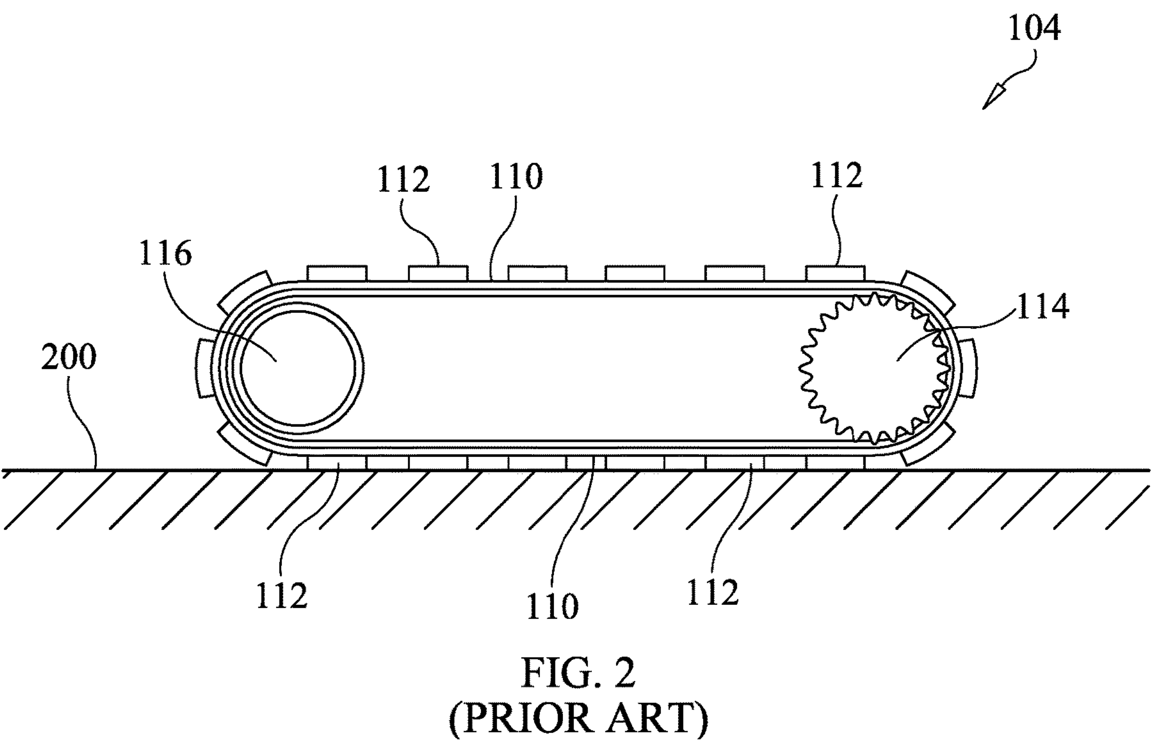
FIG. 2 is an isolated side schematic view of a conventional endless track drive on an operating surface.

As shown in FIG. 2, each conventional endless track drive 104 includes an endless belt 110 having a plurality of surface-contacting feet 112 fixedly coupled thereto. Endless belt 110 is driven to rotation by, for example, a drive sprocket or wheel 114 coupled to a motor drive (not shown). One or more free wheel 116 are provided to keep endless belt 110 properly tensioned and to support rotation of endless belt 110 as drive wheel 114 is rotated as is well-known in the art.

Briefly, as track drive vehicle 100 is driven on an operating surface 200 (e.g., horizontal surface, sloped surface, vertical surface), a portion of feet 112 are in contact with surface 200 and a remainder of feet 112 are not in contact with surface 200. When track drive vehicle 100 is to be turned on surface 200, endless track drives 104 shown in FIG. 1 are rotated at different speeds thereby causing vehicle 100 to essentially slide or skid through an arc. More specifically, side forces are applied to portions of the rotating endless track drives causing the drives to slide or skid on surface 200. As a result, the feet 112 of the skidding portions of the track drives that are in contact with surface 200 are dragged across the surface. The sliding/skidding feet subject the operating surface to damage, while the track drives and their various parts are subjected to substantial stress.

The present invention reduces or eliminates the side slide/skid associated with the turning of track drive vehicles. The novelty of the present invention will be explained herein for a single track drive. However, it is to be understood that a typical track drive vehicle would have two of the present invention's track drives coupled thereto, each of which will be configured with the present invention's novel features.

Figure 3:
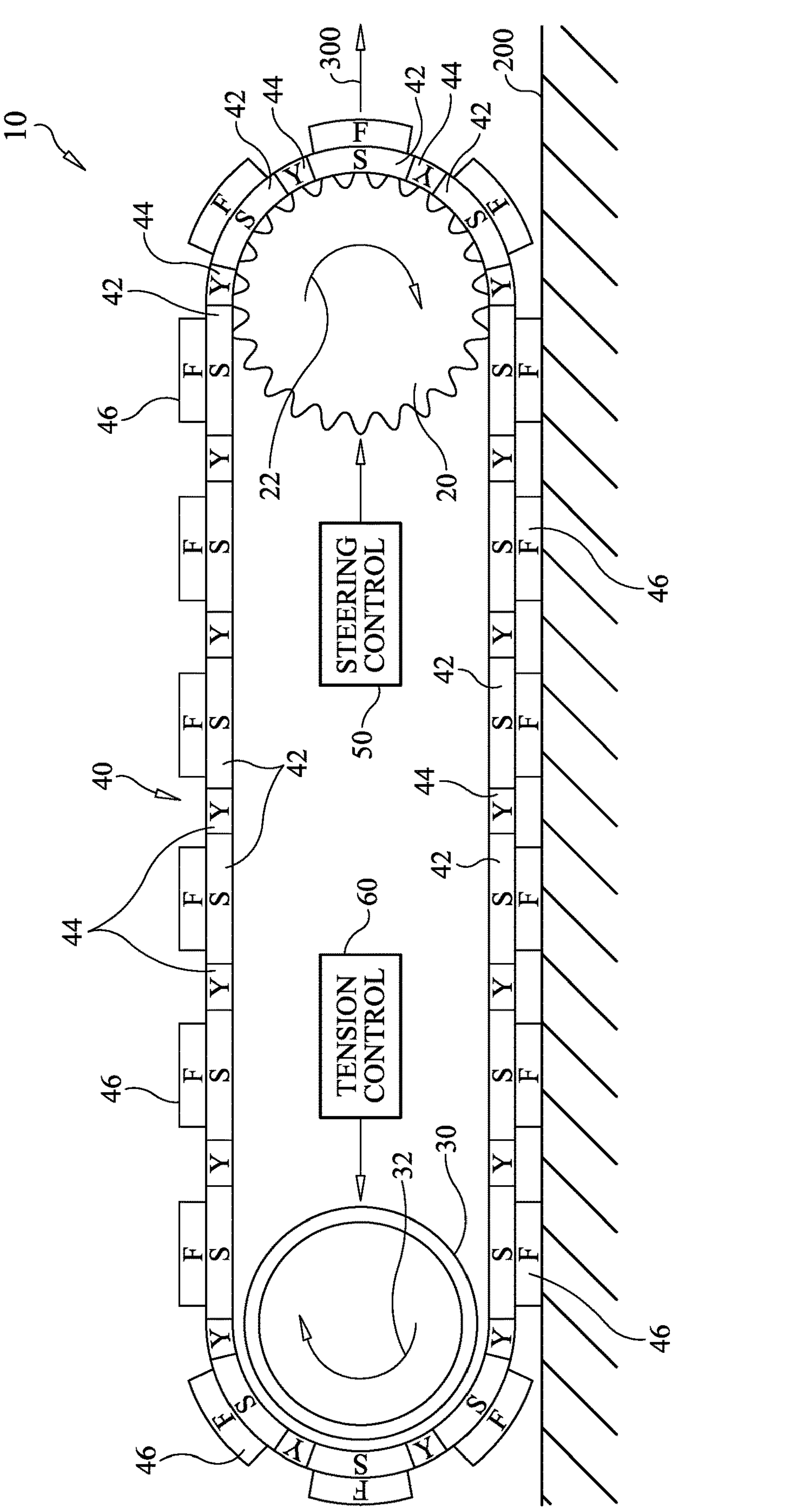
FIG. 3 is a side schematic view of an articulated-link turnable track drive in accordance with an embodiment of the present invention.

Referring now to FIG. 3, a side schematic view of a single track drive in accordance with an embodiment of the present invention is shown and is referenced generally by numeral 10. As will be explained further below, two of track drive 10 will typically be used to construct a track drive system that can be coupled to a vehicle body to thereby construct a track drive vehicle. Since both such track drives would incorporate the present invention's novel features, it is sufficient to describe those features for a single track drive.

Track drive 10 is an endless track drive that includes a drive wheel 20, a free wheel 30, an endless belt 40, a steering control 50 coupled to drive wheel 20, and a tension control 60 coupled to free wheel 30. In general, endless belt 40 is rotated about drive wheel 20 and free wheel 30 to generate movement of track drive 10 along surface 200 in a direction of travel indicated by arrow 300. The rotation of endless belt 40 results from rotation (indicated by arrow 22) of drive wheel 20 brought about by a drive motor (not shown) that would be coupled to drive wheel 20 as would be well-understood in the art. The resulting rotation of endless belt 40 causes a corresponding rotation (indicated by arrow 32) of free wheel 30.

In accordance with the present invention, steering control 50 is coupled to drive wheel 20 for turning drive wheel 20 as it rotates to control or alter direction of travel 300 on surface 200. Free wheel 30 is restrained from such turning motion. As will be described further below, endless belt 40 has articulating links to support the steering of drive wheel 20 such that the surface-engaging portions of endless belt 40 do not slide or skid on surface 200. Tension control 60 essentially moves free wheel 30 towards or away from drive wheel 20 in order to maintain the proper tension in endless belt 40 for all directions of travel 300 brought about by the turning of drive wheel 20.

In terms of its ability to provide a no-skid steering maneuver on surface 200, endless belt 40 has a plurality of links or segments 42 (designated "S" in FIG. 3) where adjacent ones of segments 42 are coupled together at an interface 44 (designated by "Y" in FIG. 3) that supports yaw motion. As used herein, the phrase "yaw motion" refers to the yaw experienced by a portion of segments 42 corresponding to a turn angle of drive wheel 20 that is relative to the current direction of travel 300. For example and using the plane of the paper for FIG. 3 as a reference, if drive wheel 20 and free wheel 30 are currently in line with one another, direction of travel 300 will be in the plane of the paper. Then, if drive wheel 20 is turned by steering control 50 into or out of the plane of the paper, any of segments 42 in engagement with drive wheel 20 but not engaged with surface 200 will experience a corresponding amount of yaw motion relative to the current direction of travel 300.

Figure 4:
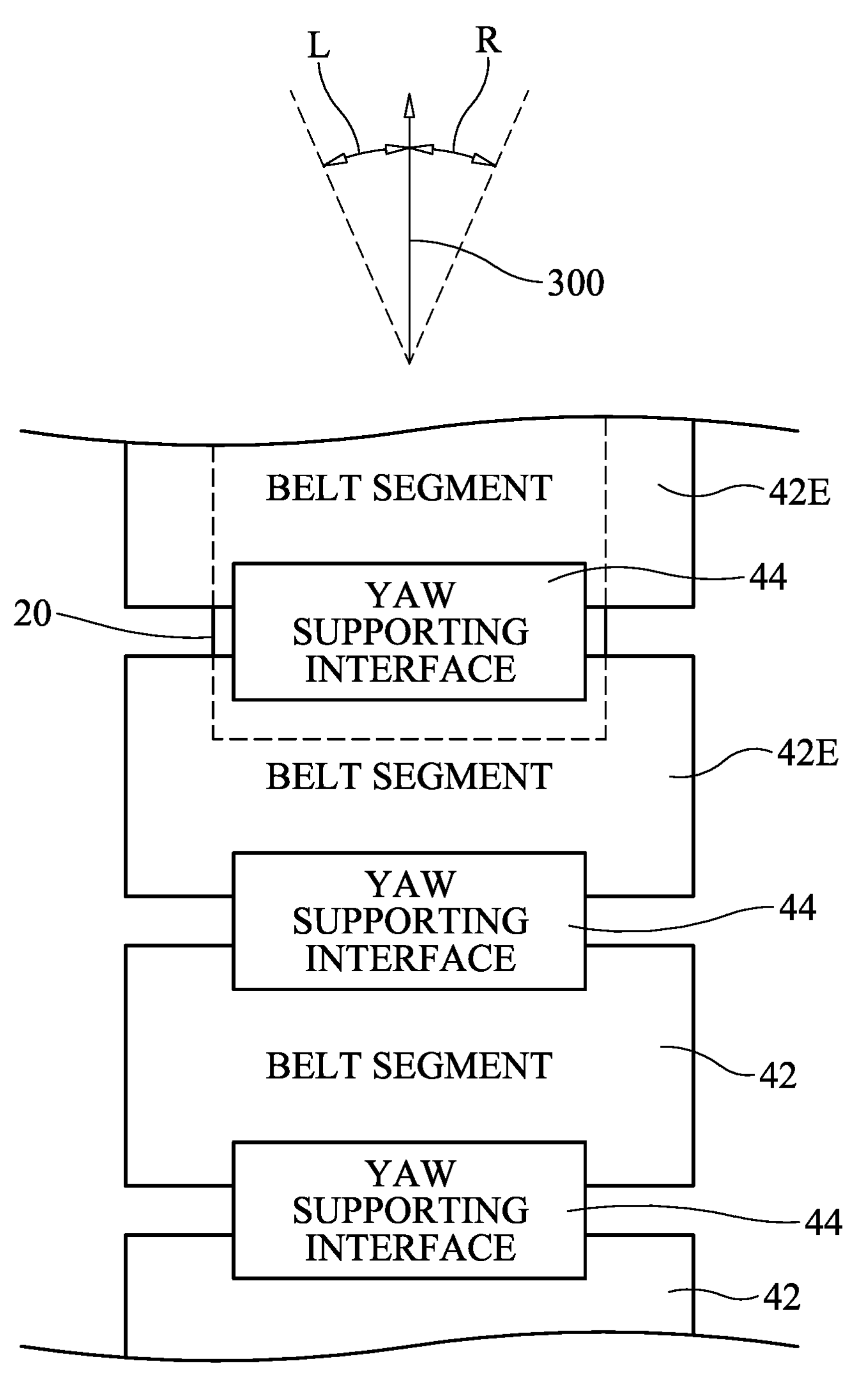
FIG. 4 is an isolated schematic plan view of a portion of an endless belt where it engages the track drive's drive wheel in accordance with an embodiment of the present invention.

In further explanation of the above-described principal of operation, additional reference is made to FIG. 4 where two of belt segments 42 engaged by drive wheel 20 are indicated by reference numeral 42E. When drive wheel 20 is steered through either a left ("L") or right ("R") angle relative to the current direction of travel 300, only engaged segments 42E not in contact with the surface (i.e., surface 200 in FIG. 3) will experience corresponding yaw motion as supported by coupling ones of interface 44.

Typically, endless belt 40 has a plurality of surface-engaging feet ("F") 46, one or more of which can be coupled to each belt segment 42. As endless belt 40 rotates about wheels 20 and 30, a portion of feet 46 engage operating surface 200, while a remainder of feet 46 do not as is well understood in the art. The surface of each foot 46 that will engage surface 200 can include some type of mechanical features (e.g., three-dimensional or relief features) that aid in gripping surface 200. If surface 200 is one that is magnetically attractive, the surface engaging portion of each foot 46 could be magnetic. In some embodiments of the present invention, feet 46 could be magnetic with their surface engaging portions also including mechanical surface gripping features. For other embodiments, some of feet 46 could have three-dimensional surfaces, while others of feet 46 have magnetic surfaces without departing from the scope of the present invention. Still other or additional grip enhancing features could include suction cups or chemical forms of adhesion without departing from the scope of the present invention.

An operational scenario for a track drive configured in accordance with the present invention will now be explained with reference to FIGS. 5A and 5B that illustrate the non-surface engaging portion (e.g., the top) of endless belt 40 in a plan view thereof. For clarity of illustration, none of the surface engaging feet of endless belt 40 are shown in FIGS. 5A and 5B.

Figures 5A, 5B:
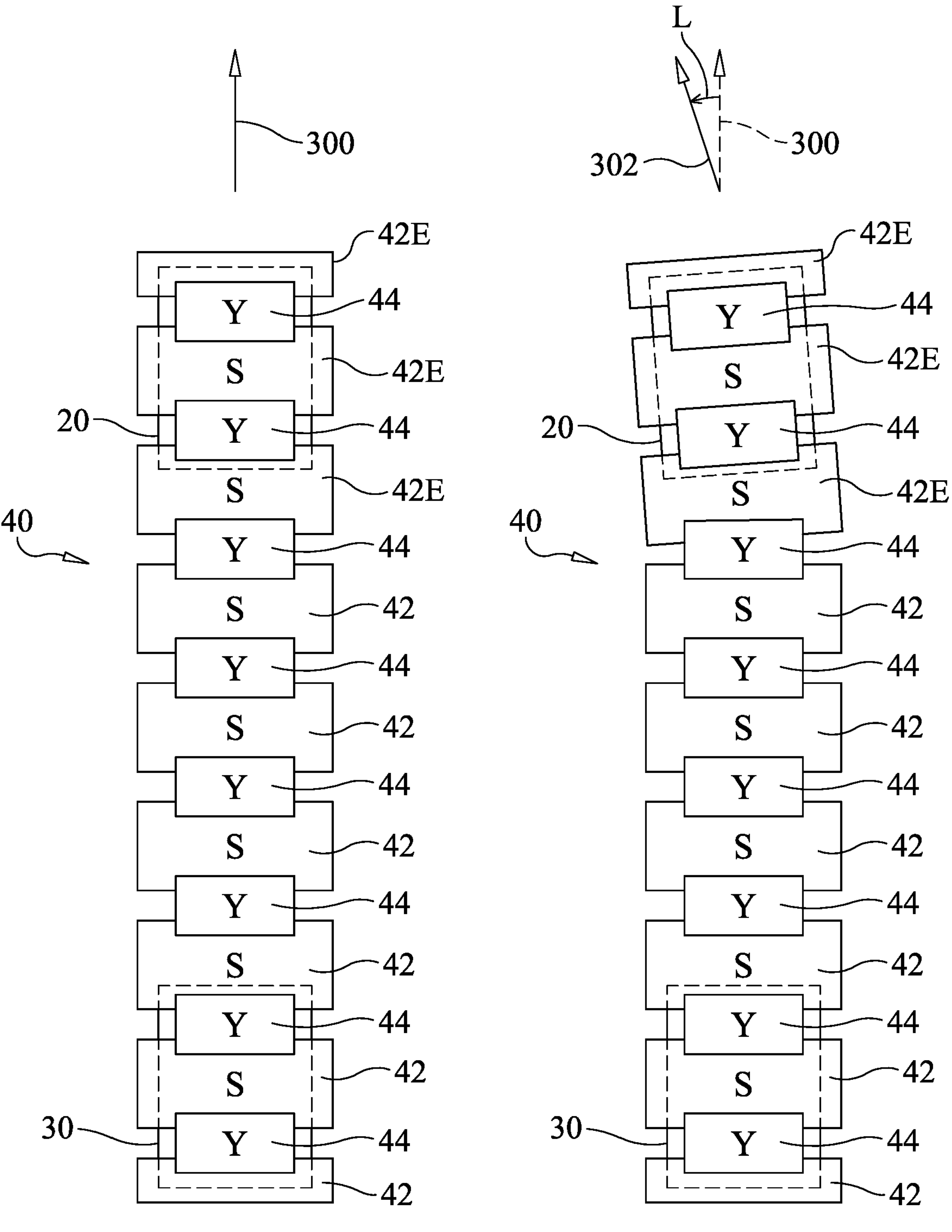
FIG. 5A is a schematic view of the top or non-surface engaging portion of an endless belt when the track drive's drive wheel is not being turned.
FIG. 5B is a schematic view of the top or non-surface engaging portion of an endless belt when the track drive's drive wheel is being turned.

In FIG. 5A, drive wheel 20 and free wheel 30 are in alignment with one another to produce a straight-line current direction of travel 300 as the non-surface-engaging ones of drive-wheel-engaged segments 42E of endless belt 40 do not experience any yaw motion. Then, as the foot/feet of engaged segments 42E engage the track drive's operating surface, the track drive remains on the current direction of travel 300 since engaged segments 42E are not experiencing yaw motion.

In FIG. 5B, drive wheel 20 is turned through a left angle "L" (relative to direction of travel 300 shown in FIG. 5A) such that the non-surface-engaging ones of drive-wheel-engaged segments 42E experience yaw motion in correspondence with turning angle "L" as supported by the ones of interfaces 44 coupled to engaged segments 42E. Accordingly, as a yawing engaged segment 42E contacts the ground/surface on which the track drive rests, the track drive will begin to undergo a no-skid turn to a new direction of travel 302.

Figure 6:
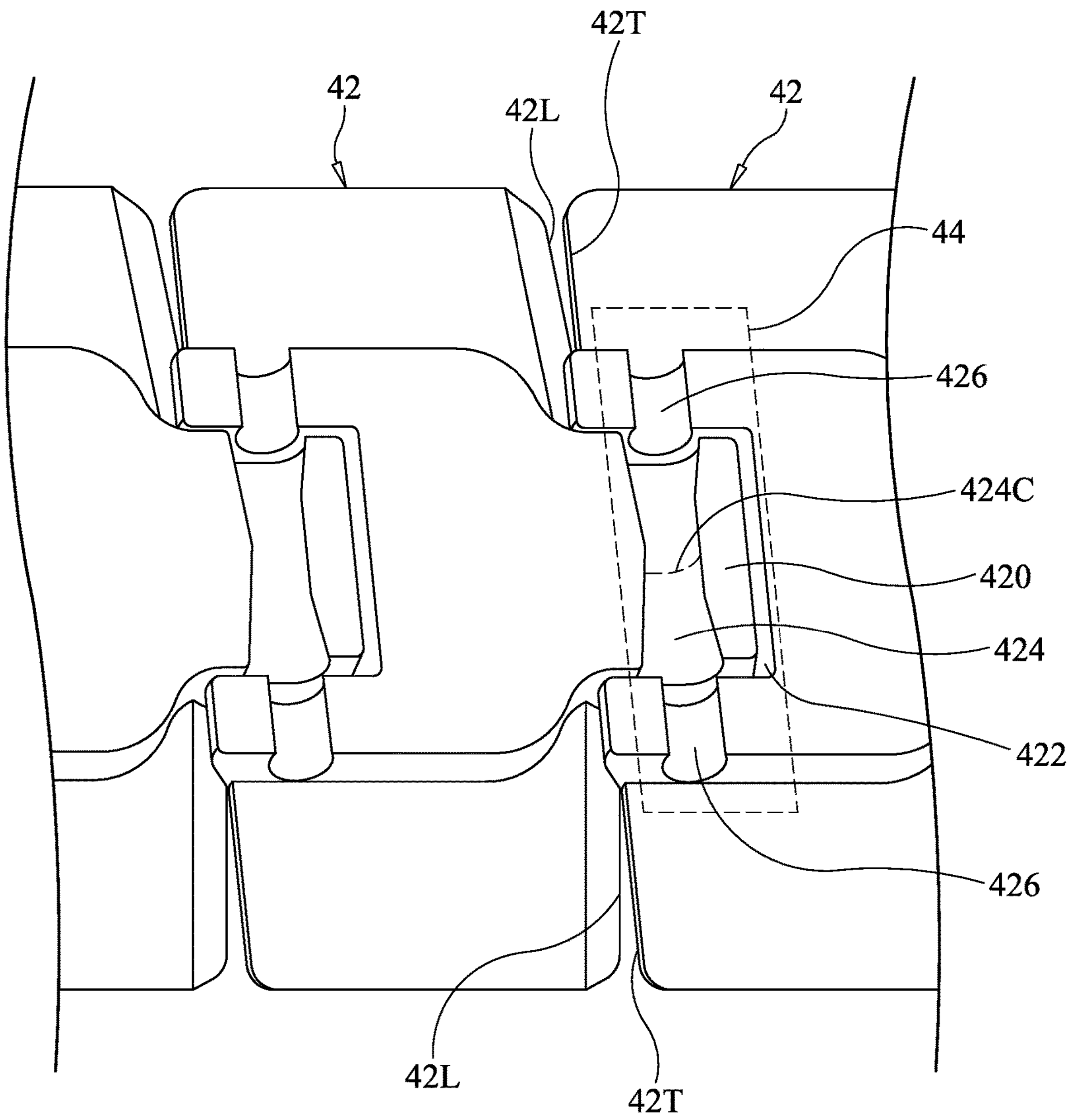
FIG. 6 is a perspective and partial cutaway view of two segments of an endless belt coupled to one another at an interface that supports yaw motion between the two segments in accordance with an embodiment of the present invention.

Belt segments 42 and yaw supporting interfaces 44 can be configured in a variety of ways without departing form the scope of the present invention. By way of an illustrative example, one such configuration is shown in FIG. 6 where two adjacent belt segments 42 are adjoined to support yawing motion between them at an interface indicated within the dashed line region 44. A portion of interface 44 has been cut away in order to illustrate features thereof that support yawing motion. The leading edge 42L and trailing edge 42T of adjacent segments 42 are spaced apart from one another. The central portion of leading edge 42L has a protruding tab 420 fitted into a receiving receptacle 422 at the trailing edge 42T of the belt segment 42 forward of leading edge 42L. Tab 420 is illustrated in a cutaway view to reveal an hour-glass sleeve 424 having its narrowest diameter at the center 424C thereof. Sleeve 424 is longitudinally aligned with pin-supporting sleeves 426 formed at trailing edge 42T of the adjacent segment 42. A pin (not shown) will rest along the adjoined lengths of sleeves 424 and 426 thereby "pinning" the two adjacent segments 42 to one another. The hour-glass shape of sleeve 424 allows tab 420 to experience yaw motion about sleeve center 424C when the associated segment 42 is turned via its engagement with the track drive's drive wheel as explained above.

The advantages of the present invention are numerous. Well-known track drive vehicles can be improved to provide non-skid turning operations that preserve the integrity of an operating surface. The feet on the endless belt can be configured for operation on a variety of surfaces and surface orientations.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A track drive for turning a direction of travel on a surface, comprising:

a drive wheel;

a drive motor coupled to said drive wheel, said drive motor configured for rotation of said drive wheel;

an endless belt having a plurality of segments coupled together, with each of said plurality of segments configured for both engaging a portion of said drive wheel and yawing motion between adjacent segments of said plurality of segments and relative to the direction of travel, wherein motion of said endless belt along the direction of travel is dictated by the rotation of said drive wheel, and wherein each segment of said plurality of segments has a leading edge with a central portion protruding tab, having an hourglass sleeve with a center sleeve diameter intervening between two hourglass lateral diameters, and a trailing edge with a trailing receptacle, having two pin-supporting sleeves with pin-supporting sleeve diameters, with each central portion protruding tab configured to be fitted into each receiving receptacle such that said plurality of segments are joined by rotatably coupling each central portion protruding tab into each trailing receptacle that is adjacent along said plurality of segments of said endless belt to enable and support yawing motion between said plurality of segments to alter the direction of travel, wherein each coupling supporting yawing motion includes a pin configured for pinning two adjacent segments to one another and the center sleeve diameter of the hourglass sleeve is equal to the pin-supporting sleeve diameters and narrower than the hourglass lateral diameters on each side of the protruding tab that are more proximal to the pin-supporting sleeves of the trailing receptacle, which while coupled by the pin, thereby allows the protruding tab to experience yaw motion about the center sleeve diameter when turned by engagement with said drive wheel of said track drive and maintains the center sleeve diameter of the hourglass sleeve aligned co-axially with the pin-supporting sleeves in travel in the direction of travel other than turning;

a steering device coupled to said drive wheel, said steering device configured for turning said drive wheel relative to the direction of travel by no skid turn, wherein the yawing motion is generated for a portion of said plurality of segments, such that only segments of said endless belt engaging the portion of said drive wheel experience the yawing motion in correspondence with turning relative to the direction of travel, while maintaining other segments of said endless belt that contact the surface aligned in the direction of travel;

a free wheel engaging said endless belt wherein said free wheel rotates in correspondence with motion of said endless belt; and a tensioning device coupled to said free wheel for moving said free wheel relative to said drive wheel to maintain tension in said endless belt when said drive wheel is turned by said steering device.

2. The track drive of claim 1, wherein:

each segment of said plurality of segments has a surface side and a drive side; and each segment of said plurality of segments further comprises at least one foot coupled to said each segment of said plurality of segments on said surface side and adapted to engage the surface on which said track drive is driven opposite said drive side that engages a portion of said drive wheel.

3. The track drive of claim 2, wherein each said foot mechanically engages the surface when in contact therewith.

4. The track drive of claim 2, wherein each said foot magnetically engages the surface when in contact therewith.

5. The track drive of claim 1, wherein:

each leading edge and each trailing edge of adjacent segments are sloped; and each leading edge and each trailing edge of adjacent segments are maintained spaced apart from one another by contour geometry of each central portion protruding tab, trailing receptacle, and each pin of each coupling supporting yawing motion.

6. The track drive of claim 2, wherein at least one foot coupled to said each segment of said plurality of segments includes a plurality of feet coupled to said each segments and adapted to engage a surface on which said track drive is driven.

7. The track drive of claim 2, wherein each foot of said at least one foot is both magnetic and has surface engaging portions including mechanical surface gripping features.

8. A single track drive for turning a direction of travel on a surface, comprising:

a drive wheel;

a drive motor adapted to be coupled to said drive wheel and configured for rotation of said drive wheel;

an endless belt having a plurality of segments and configured for both engaging a portion of said drive wheel and yawing motion between adjacent segments of said plurality of segments and relative to said the direction of travel, wherein motion of said endless belt along the direction of travel is dictated by the rotation of said drive wheel, and wherein each segment of said plurality of segments has a leading edge with a central portion protruding tab having an hourglass sleeve with a center sleeve diameter intervening between two hourglass lateral diameters, and a trailing edge with a trailing receptacle, having two pin-supporting sleeves with pin-supporting sleeve diameters, with each central portion protruding tab configured to be fitted into each trailing receptacle such that said plurality of segments are joined by rotatably coupling each central portion protruding tab into each trailing receptacle that is adjacent along said plurality of segments of said endless belt, to enable and support yawing motion between adjacent segments to alter the direction of travel, wherein each coupling that supports yawing motion has a pin configured for pinning two adjacent segments to one another and the center sleeve diameter of the hourglass sleeve is equal to the pin-supporting sleeve diameters and narrower than the hourglass lateral diameters on each side of the protruding tab that are more proximal to the pin-supporting sleeves of the trailing receptacle, which while coupled by the pin, thereby allows the protruding tab to experience yaw motion about the center sleeve diameter when turned by engagement with said drive wheel of said track drive and maintains the center sleeve diameter of the hourglass sleeve aligned co-axially with the pin-supporting sleeves in travel in the direction of travel other than turning;

a steering device coupled to said drive wheel, said steering device configured for turning said drive wheel relative to the direction of travel by no skid turn, wherein the yawing motion is generated for a portion of said plurality of segments such that only segments of said endless belt engaging the portion of said drive wheel experience the yawing motion in correspondence with turning relative to the direction of travel, while maintaining other segments of said endless belt that contact the surface aligned in the direction of travel;

a free wheel engaging said endless belt wherein said free wheel rotates in correspondence with motion of said endless belt; and a tensioning device coupled to said free wheel, said tensioning device configured for moving said free wheel in one of towards and away from said drive wheel to maintain tension in said endless belt between said free wheel and said drive wheel when said drive wheel is turned by said steering device.

9. The track drive of claim 8, wherein:

each segment of said plurality of segments has a surface side and a drive side; and each segment of said plurality of segments further comprises at least one foot coupled to said each segment of said plurality of segments on said surface side and adapted to engage the surface on which said track drive is driven opposite said drive side that engages a portion of said drive wheel.

10. The track drive of claim 9, wherein each said foot mechanically engages the surface when in contact therewith.

11. The track drive of claim 9, wherein each said foot magnetically engages the surface when in contact therewith.

12. The track drive of claim 8, wherein:

each leading edge and each trailing edge of adjacent segments are sloped; and each leading edge and each trailing edge of adjacent segments are maintained spaced apart from one another by contour geometry of each central portion protruding tab, trailing receptacle, and each pin of each interface that supports yawing motion.

13. The track drive of claim 9, wherein at least one foot coupled to said each segment of said plurality of segments includes a plurality of feet coupled to said each segments and adapted to engage a surface on which said track drive is driven.

14. The track drive of claim 9, wherein each foot of said at least one foot is both magnetic and has surface engaging portions including mechanical surface gripping features.

* * * * *